D. Jones.
Steering Apparatus.
N° 42,195. Patented Apl. 5, 1864.
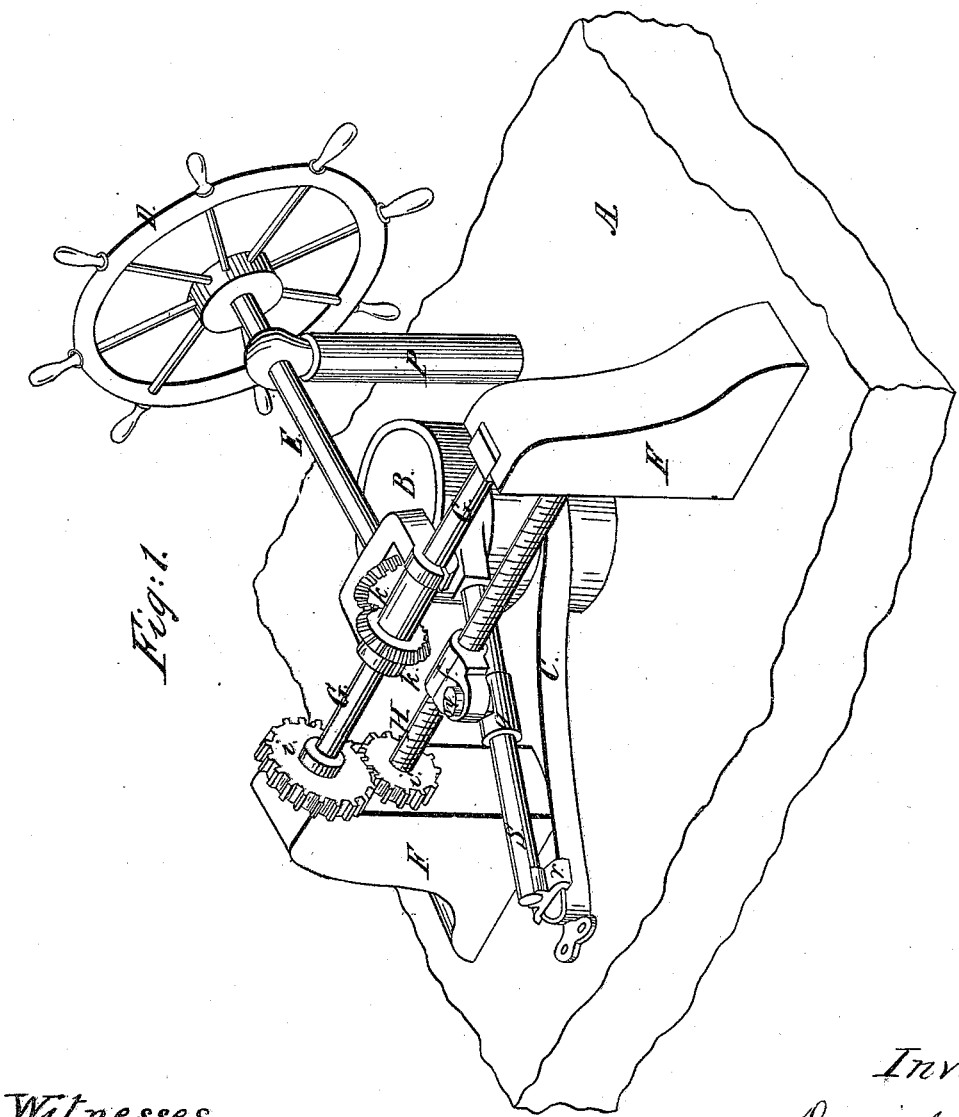
Witnesses.
Thos. H. Uppperman
Chas. E. Uppperman
Inventor.
Daniel Jones
By his Attorney
Chas. F. Ganebury

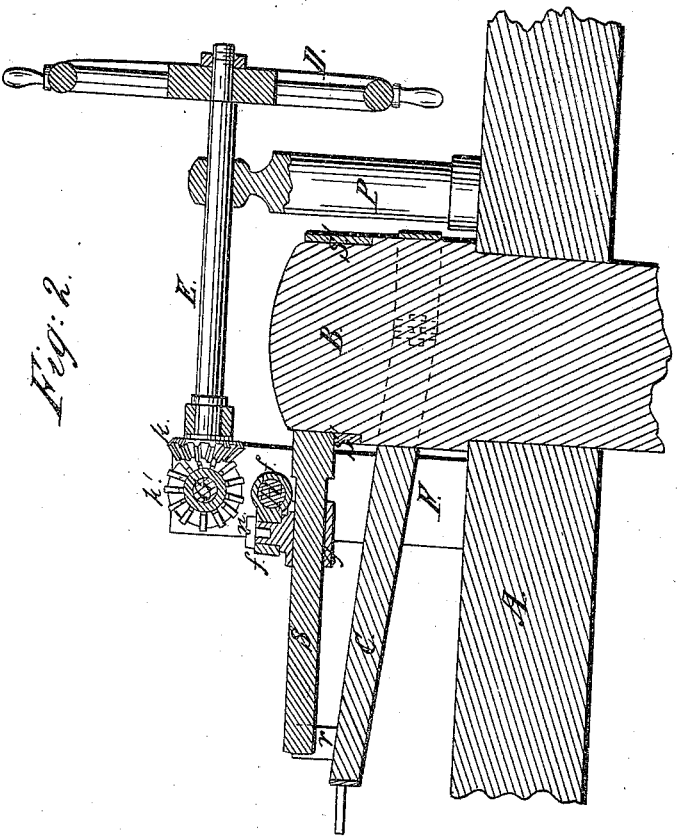

UNITED STATES PATENT OFFICE.

DANIEL JONES, OF BOSTON, MASSACHUSETTS.

IMPROVED STEERING APPARATUS.

Specification forming part of Letters Patent No. 42,195, dated April 5, 1864.

*To all whom it may concern:*

Be it known that I, DANIEL JONES, of Boston, in the county of Suffolk and State of Massachusetts, have invented a new and Improved Steering Apparatus; and I do hereby declare the following to be a full and correct description of the same, reference being had to the accompanying drawings, in which—

Figure 1 is a perspective view of my improved steering apparatus, and Fig. 2 a vertical longitudinal central section of the same.

The same part is marked by the same letter of reference in both the figures.

The nature of my invention consists in the addition of improvements to the steering apparatus patented by me February 21, 1860, by which that apparatus is simplified and rendered less expensive, and in the introduction of the entirely new feature of an auxiliary tiller, by the employment of which I avoid those sudden and wrenching strains upon the rudder-post which occur in all steerers in which the tiller is rigidly secured to that post.

To enable others skilled in the art to make and use my improved steering apparatus, I will proceed to describe its construction and operation, referring to the drawings, wherein—

A marks the deck of the vessel; B, the rudder-post; C, the main tiller, which is attached to the rudder-post in the usual rigid manner; D, the wheel; E, the wheel-shaft passing through the head of stanchion P, and having on its rear end the cogged bevel-pinion $k$.

F F are two heavy bits attached firmly to the deck. They serve to support the journals of shaft G and screw H, which extend from one to the other, as shown in Fig. 1. The shaft G has a bevel cogged pinion, $k'$, attached to it, which gears into the similar pinion, $k$, on the rear end of wheel-shaft E. On the end of shaft G is a spur-wheel, $i$, which meshes into and drives a pinion on the end of screw H. On screw H is placed a traveling nut, $f$, which is pivoted by $n$ to a sleeve, $g$, which slides on tiller S.

S is the secondary or auxiliary tiller, which may be attached somewhat loosely to the main tiller by a band, S', passing around its head, as shown. When required to be used as a main tiller, it can be rigidly attached to the rudder-post. It is secured to the main tiller by the glut $r$. When the auxiliary tiller has a loose attachment to the rudder-post, I use elastic springs at the ends where the main and auxiliary tillers are united. It will be observed that this construction differs from that of the steerer patented by me in February, 1860, by having the spur-wheel $i$ at the end of driving-shaft G, to engage with a similar wheel on the end of screw H, thus giving motion to the screw and allowing the nut $f$ to traverse the entire length of the screw.

The auxiliary tiller, which also constitutes a new feature in this invention, is applicable, with slight modifications, to most of the mechanical steerers now in use, and I contemplate such an application of it whenever desirable.

The operation of the apparatus is apparent from its construction, the principal advantage resulting from it being the saving of the wrenching strains before alluded to.

Having thus fully described my invention, what I claim, and desire to secure by Letters Patent, is—

1. The combination of the shaft G, wheel $i$, pinion $i'$, screw H, nut $f$, and sleeve $g$, in the manner and for the purpose specified.

2. The auxiliary tiller S, constructed and operating substantially as described.

DANIEL JONES.

Witnesses:
SAM. S. CURTIS,
GEO. R. RAY.